United States Patent

Satomi et al.

[11] Patent Number: 5,598,044
[45] Date of Patent: Jan. 28, 1997

[54] LINEAR MOTOR

[75] Inventors: Hirobumi Satomi; Takao Iwasa, both of Kashiwa, Japan

[73] Assignee: Oriental Motor Co., Ltd., Tokyo, Japan

[21] Appl. No.: 305,355

[22] Filed: Sep. 13, 1994

[30] Foreign Application Priority Data

Sep. 13, 1993 [JP] Japan .................... 5-226784

[51] Int. Cl.⁶ ................................ H02K 41/02
[52] U.S. Cl. ........................... 310/12; 310/14
[58] Field of Search ........................... 310/12, 14

[56] References Cited

U.S. PATENT DOCUMENTS

| | | | |
|---|---|---|---|
| 3,441,819 | 4/1969 | Palmero | 318/115 |
| 5,418,413 | 5/1995 | Satomi | 310/12 |
| 5,438,227 | 8/1995 | Satomi | 310/14 |

FOREIGN PATENT DOCUMENTS

| | | | |
|---|---|---|---|
| 0319096 | 6/1989 | European Pat. Off. | H02K 41/03 |
| 2906404 | 8/1980 | Germany | H02K 41/03 |
| 6225513 | 8/1994 | Japan | 310/14 |
| 6315258 | 11/1994 | Japan | 310/12 |

Primary Examiner—Thomas M. Dougherty
Attorney, Agent, or Firm—Jacobson, Price, Holman & Stern, PLLC

[57] ABSTRACT

A linear motor includes a stator 1 having an even number N of salient poles 11, 12, . . . disposed at an equal angle pitch and a mover 3 disposed movably in a shaft direction. The salient poles are constituted by pairs of salient poles adjacent to each other and including m sets of salient pole groups composed of (N/2m) sets of salient pole pairs disposed at an angle of (720m/N) degrees. Windings W1, W2, . . . wound on (N/m)-1 or (N/m)-2 salient poles belonging to each of the salient pole groups are connected to have opposite polarities between the pair of salient poles and are connected to have the same polarity between the salient poles which do not constitute the pair of salient poles and are disposed to interpose the salient pole of the other phase therebetween to constitute phase windings for m phases. Remaining salient poles of the salient pole group are caused to detect a position and a movement direction of the mover 3 as sensor poles $S_A$ and $S_B$.

3 Claims, 8 Drawing Sheets

A-PHASE  B-PHASE

LINEAR MOTOR

BACKGROUND OF THE INVENTION

The present invention relates to a linear motor, and more particularly to a linear motor operated as a two-phase and a multi-phase linear pulse motor or a brushless DC linear motor.

FIG. 10 is a longitudinal sectional view illustrating a permanent magnet type cylindrical linear motor pertinent to the present invention.

In FIG. 10, a stator core 101 of a stator 100 of the permanent magnet type cylindrical linear motor includes a ring-like yoke portion having a small inner diameter and forming ring-like stator tooth tops 102a and a ring-like yoke portion having a large inner diameter and forming ring-like stator tooth bottoms 102b, both the yoke portions being laminated alternately in the shaft direction. Thus, stator teeth 102 composed of a number of ring-like tooth tops 102a and ring-like tooth bottoms (grooves) 102b are formed in the inner peripheral surface of the stator core 101 at equal pitches in the shaft direction.

Ring-like windings 103, 104, . . . 110 are disposed in the ring-like tooth bottoms (grooves) 102b, respectively. The ring-like windings 103, 104, . . . 110 are configured to have two phases in total as shown in FIG. 11 so that the ring-like windings 103, 105, 107 and 109 are connected so that the polarities thereof are reversed alternately to form one phase (A phase) and the ring-like windings 104, 106, 108 and 110 are connected so that the polarities thereof are reversed alternately to form the other phase (B phase). Since the stator 100 is configured as above, the pole pitch of the stator 100 is four times the tooth pitch of the stator teeth 102.

Further, a mover core 301 of a mover 300 is cylindrical and permanent magnet poles 302 magnetized to have the polarities different radially and alternately are disposed on the outer periphery of the mover core at a pitch equal to twice the tooth pitch of the stator teeth 102. Consequently, the pole pitch of the mover 300 is four times the pitch of the stator teeth and is coincident with the pole pitch of the stator 100.

The two-phase windings disposed in the stator core 101 are shifted from each other by the tooth pitch of the stator teeth, that is, a quarter of the pole pitch of the stator in the shaft direction, and the linear motor constitutes a two-phase permanent magnet type cylindrical linear pulse motor having a basic amount of movement for each step which is equal to a quarter of the pole pitch, that is, the pitch of the stator teeth.

In the permanent magnet type cylindrical linear pulse motor as configured above, however, in order to connect the ring-like windings 103, 104, . . . 110, it is necessary to provide notches in the outer peripheral portion of the ring-like yoke portions of the tooth tops 102a and the tooth bottoms 102b and pull out ends of the windings 103, 104, . . . 110 from the notches so that the pulled-out ends are connected and are accommodated in lead pulling-out grooves formed in the notches. Accordingly, there is a problem that the operation efficiency of the motor assembly is deteriorated.

On the other hand, the size of the tooth bottoms 102b of the stator teeth 102 accommodating the windings 103, 104, . . . 110 depends on the pitch of the stator teeth. When the pitch of the stator teeth is small, the tooth bottom 102b cannot be made larger and the ampere-conductors per phase cannot be increased. Accordingly, there is a problem that the driving force is low.

Further, since the motor is of the permanent magnet type, the motor can be operated as a brushless DC motor theoretically, while there is a problem that it is necessary to provide sensor means for detecting the position of the mover separately for that purpose.

SUMMARY OF THE INVENTION

The present invention has been made in view of the above problems and an object of the present invention is to solve the problems and provide a permanent magnet type linear motor having the improved operation efficiency of the windings and the motor assembly and capable of increasing winding accommodation portions without dependence on the tooth pitch of the stator teeth to attain a large driving force.

It is another object of the present invention to provide a permanent magnet type linear motor capable of being operated as a brushless DC motor in order to form a linear servo system inexpensively without addition of sensor means for detecting the position of the mover separately.

In order to achieve the objects, in a linear motor including a stator provided with a stator core having an even number of salient poles disposed at equal angle radially inward and a plurality of stator teeth formed on inner peripheral surfaces of the salient poles in a shaft direction and windings wound on the salient poles individually and a mover provided with a mover core disposed within the stator and supported movably in the shaft direction and having a plurality of permanent magnet poles disposed on an outer periphery thereof in the shaft direction at equal pitch equal to a half of a pitch of said stator teeth and magnetized in the radial direction to have different polarities alternately in the shaft direction, the present invention is configured as follows:

(1) The stator core includes stator core elements formed by laminating a predetermined number of stator iron plates of the stator core and the stator core elements are laminated with the elements being rotated sequentially by a predetermined angle determined by an arrangement of the salient poles of the stator iron plates to form the stator core, the stator salient poles being constituted by pairs of salient poles adjacent to each other and including m sets of salient pole groups composed of (N/2m) sets of salient pole pairs disposed uniformly at an angle of (720m/N) degrees where N is the number of the stator salient poles and m is the number of phases of the motor, windings wound on (N/m)-1 or (N/m)-2 salient poles belonging to the salient pole groups being connected to have opposite polarities to each other between the pair of salient poles and being connected to have the same polarity to each other between the salient poles which do not constitute the pair of salient poles and are disposed to interpose the salient pole of the other phase therebetween to constitute phase windings for m phases, remaining salient poles, which do not participate in phase configuration, of the salient pole group for the phases, being arranged to detect a position in the shaft direction and a movement direction of the mover as sensor poles, whereby the linear motor can be operated as an m-phase linear pulse motor or a brushless DC linear motor.

(2) The stator iron plates of the stator core include 8k salient poles when the number of phases m is 2 and k is an integer equal to or larger than 1, and k sets of salient pole groups formed by two salient poles having a small inner radius and six salient poles having a large inner radius at the tip of the salient poles opposite to the mover as viewed from the mover are disposed in the circumferential direction, the two salient poles having the small inner radius being disposed with an angle of (135/k) degrees to each other, the stator core being formed by the stator core elements laminated with sequential rotation by (135/k) degrees, a disposition pitch of the permanent magnet poles disposed on the mover core being 4t when a thickness of the stator core element in the shaft direction is t.

(3) The stator iron plates of the stator core include 12k salient poles when the number of phases m is 3 and k is an integer equal to or larger than 1, and k sets of salient pole groups formed by two salient poles having a small inner radius and ten salient poles having a large inner radius at the tip of the salient poles opposite to the mover as viewed from the mover are disposed in the circumferential direction, the two salient poles having the small inner radius being disposed with an angle of (150/k) degrees to each other, the stator core being formed by the stator core elements laminated with sequential rotation by (150/k) degrees, a disposition pitch of the permanent magnet poles disposed on the mover core being 6t when a thickness of the stator core element in the shaft direction is t.

In operation of the present invention, since the permanent magnet type linear motor configured above includes the stator windings wound on the salient poles and disposed in the circumferential direction of the stator, the operation efficiency of the windings is improved and the winding accommodation portion can be enlarged to increase the ampere-conductors without dependency on the tooth pitch of the stator teeth, so that linear motor having a large driving force can be realized.

Further, since parts of the stator salient poles can be utilized as sensor poles for detecting a position and a movement direction of the mover, the linear motor can be operated as a brushless DC linear motor.

DESCRIPTION OF THE PREFERRED EMBODIMENTS

Preferred embodiments of the present invention are now described illustratively in detail with reference to the accompanying drawings.

Figure 1:
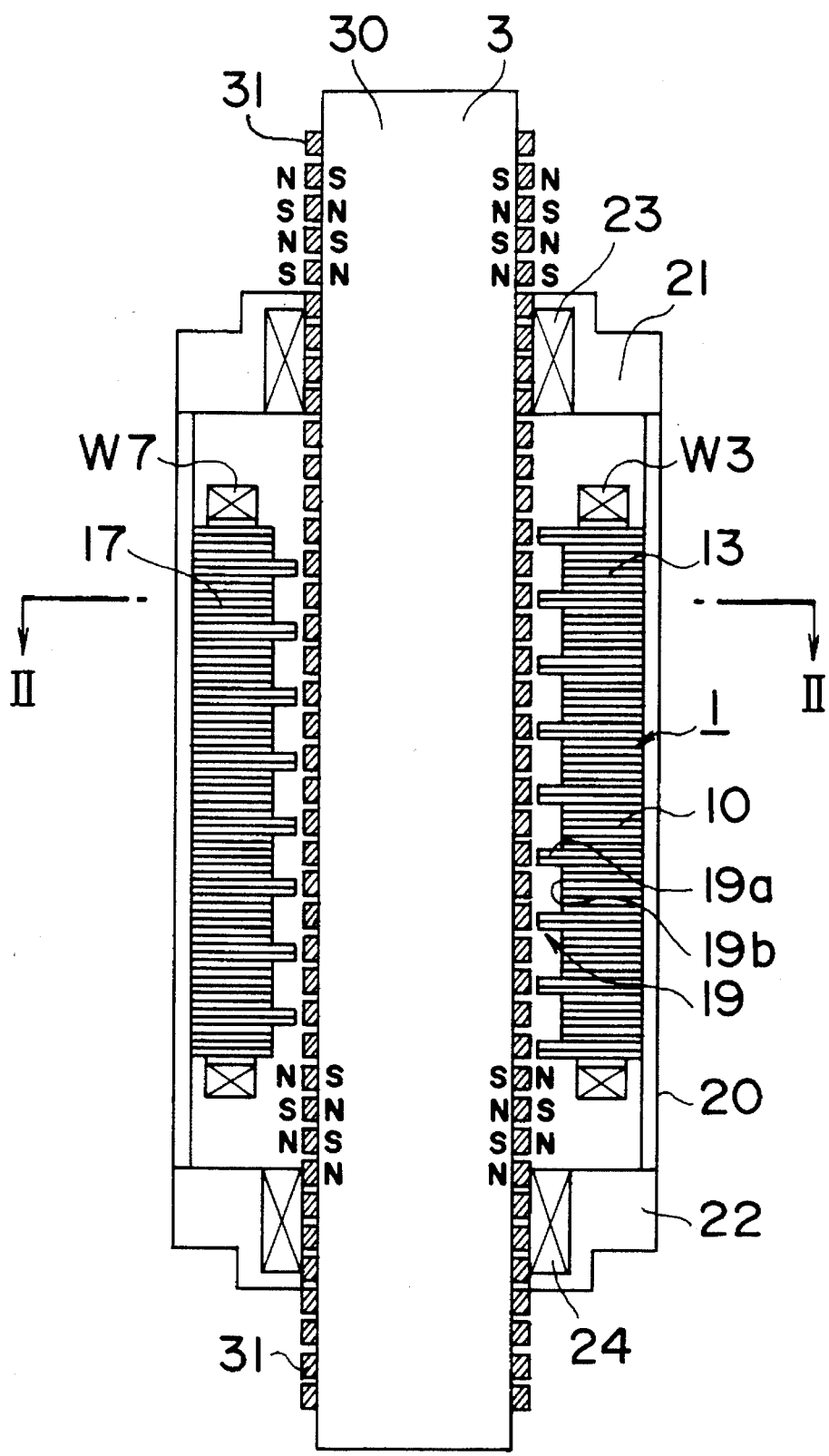
FIG. 1 is a longitudinal sectional view illustrating an embodiment of a linear motor according to the present invention.
Figure 2:
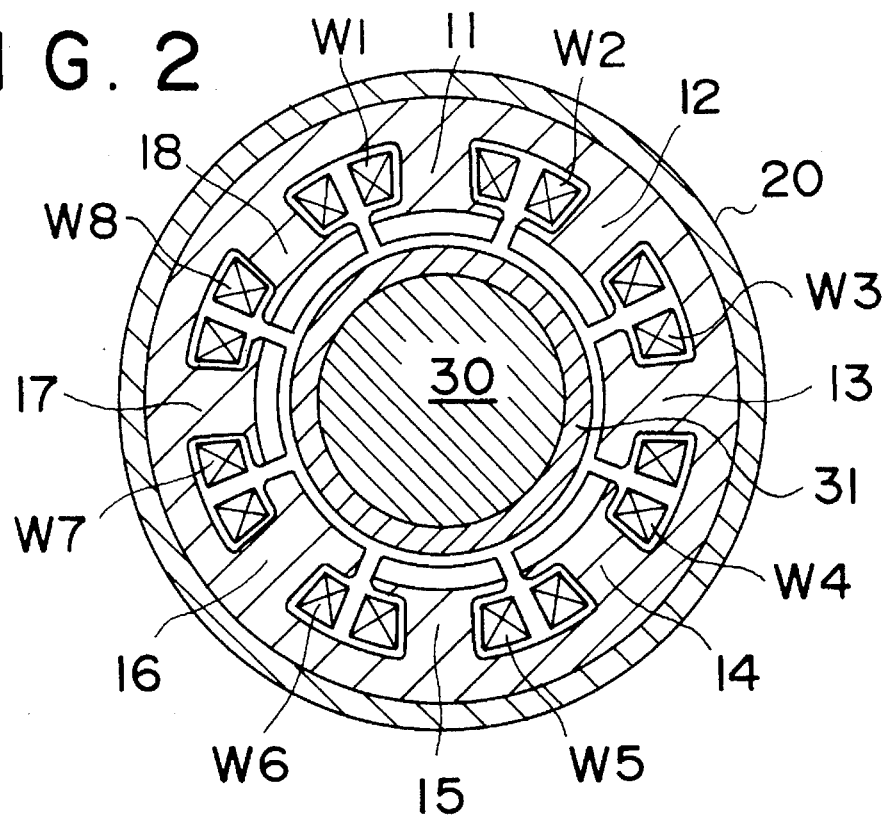
FIG. 2 is a transverse sectional view taken along line II—II of FIG. 1.

FIG. 1 is a longitudinal sectional view illustrating an embodiment of a linear motor of the present invention and FIG. 2 is a transverse sectional view taken along line II—II of FIG. 1.

The embodiment shows the case where the number of phases m and an integer k are m=2 and k=1, respectively, and accordingly the number of stator salient poles N is N=8k=8.

In FIGS. 1 and 2, a stator 1 includes a stator core 10 and stator windings W1, W2, W3, ... W8. A plurality of stator teeth 19 (tooth tops 19a and tooth bottoms 19b) are formed in the shaft direction on inner peripheral surfaces of an even, in the embodiment eight, salient poles 11, 12, 13, ... 18 disposed at equal angles radially inward from the stator core 10. The stator windings W1, W2, W3, ... W8 are wound on the eight salient poles 11, 12, 13, ... 18, respectively. The stator core 10 is accommodated and supported in a housing 20 by means of brackets 21 and 22 and screws not shown.

On the other hand, a mover core 30 of a mover 3 disposed within the stator 1 is supported movably in the shaft direction through bearings 23 and 24 by brackets 21 and 22. A plurality of ring-like permanent magnet poles 31 are disposed on an outer periphery of the mover core 30 at a pitch equal to a half of the tooth pitch of the stator teeth 19 and are magnetized in the radial direction so that the polarities on the outer peripheral side of the permanent magnet poles 31 become N and P poles alternately in the shaft direction.

Figure 3:
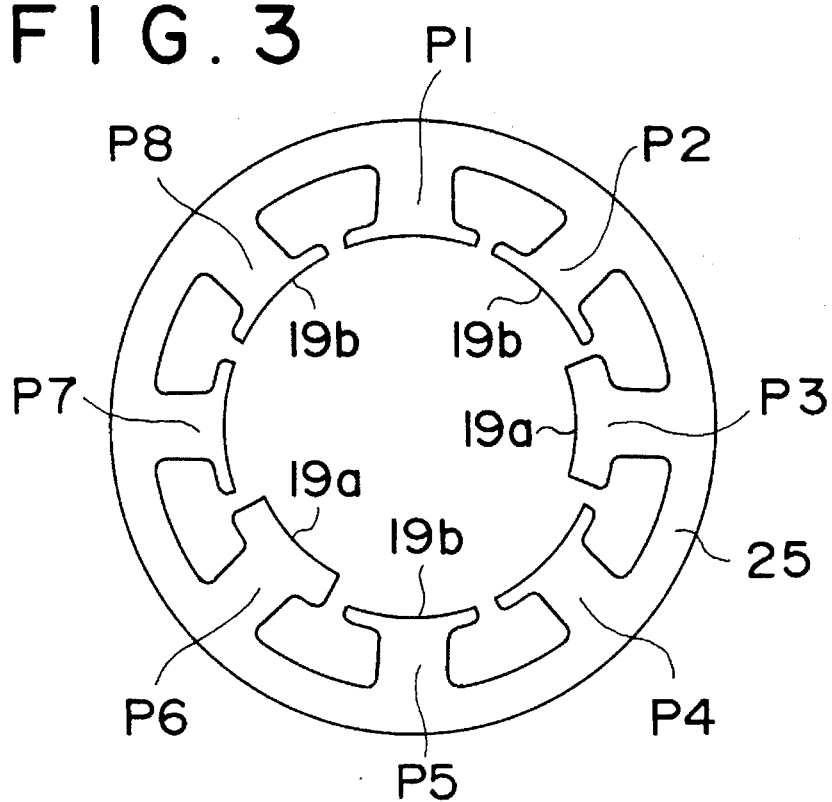
FIG. 3 is a plan view of a stator iron plate forming a stator core.

FIG. 3 illustrates an example of a stator iron plate 25 forming the stator core 10. In FIG. 3, salient poles P3 and P6 of eight salient poles P1, P2, P3, ... P8 of the stator iron plate 25 have a small inner radius at the tip thereof and constitute the tooth tops 19a of the stator teeth 19. Other salient poles P1, P2, P4, P5, P7 and P8 have a large inner radius at the tip thereof and constitute the tooth bottoms 19b of the stator teeth 19. The salient poles P3 and P6 having the small inner radius are disposed with an angle of 135 degrees therebetween. The eight salient poles are disposed in order of P1, P2, P3, ... P8 and constitute a salient pole group.

The embodiment shows the case where a value of the integer k is k=1, that is, the salient pole group composed of the salient poles P1, P2, ... P8 is one set, while in the case of, for example, k=2, two salient groups disposed in order of the salient poles P1, P2, ... P8 are disposed side by side in the circumferential direction and the salient poles having the small inner radius, of the salient pole group are disposed with an angle of 135/k degrees, that is, 67.5 degrees to each other.

Figure 4:
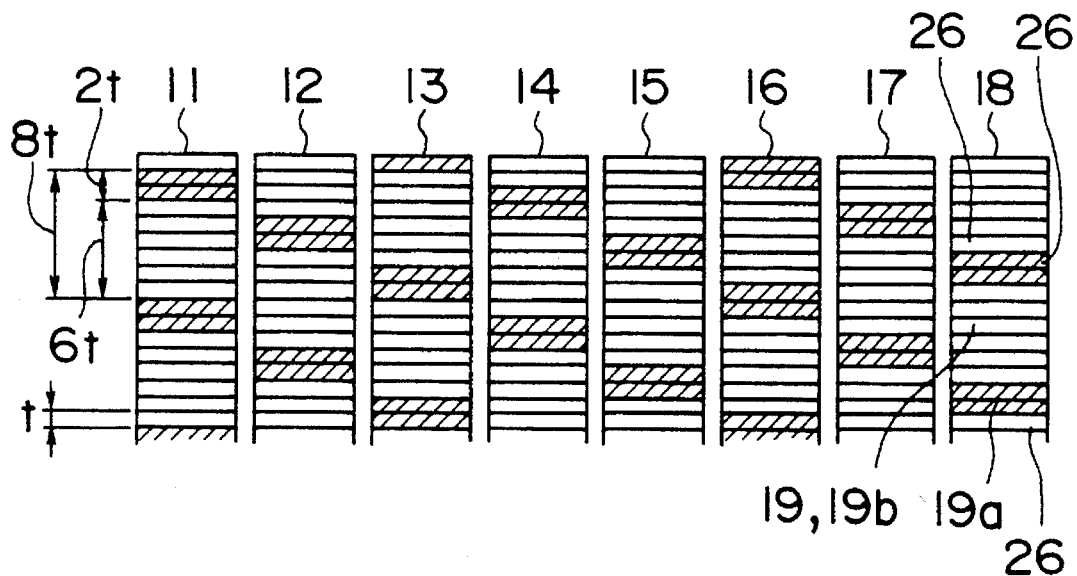
FIG. 4 is an expanded view of stator teeth formed by laminating stator iron plates with rotation by a predetermined angle as viewed from a mover.

FIG. 4 shows the stator teeth 19 including the salient poles 11, 12, 13, ... 18 formed when stator core elements 26 formed by laminating a predetermined number of stator iron plates 25 to have a thickness of t are laminated with the elements being rotated by an angle of 135/k degrees, that is, 135 degrees for k=1, as viewed from the mover 3. Hatched portions represent the tooth tops 19a and blank or unhatched portions represent the tooth bottoms 19b. By laminating the stator core elements 26 with sequential rotation, the stator teeth 19 having the tooth pitch of 8t (the thickness of the tooth is 2t and the thickness of the tooth bottom is 6t) are formed in each of the salient poles 11, 12, 13, ... 18. Accordingly, the pitch of the permanent magnet poles 31 disposed on the mover core 30 is 4t (a half of the stator teeth pitch).

Further, the shift of the teeth of the salient poles with respect to the reference of the salient pole 11 is ⅜ for the salient pole 12, ⅝ for the salient pole 13, 9/8 (that is, ⅛) for the salient pole 14, 4/8 for the salient pole 15, ⅞ for the salient pole 16, 10/8 (that is, 2/8) for the salient pole 17, and ⅝ for the salient pole 18.

In FIG. 2, two pairs of salient poles 11, 12 and 15, 16 adjacent to each other constitute N/2m sets, that is, 2 sets for m=2 and N=8k=8 having a relation that they are disposed uniformly at an angle of 720m/N degrees, that is, 180 degrees for m=2 and N=8k=8 and the two sets constitute one set of salient pole group. The salient poles 13, 14 and 17, 18 constitute other two sets having the same disposition relation and the two sets constitute one set of salient pole group, so that m=2 sets of salient pole groups are constituted in total.

Figure 5:
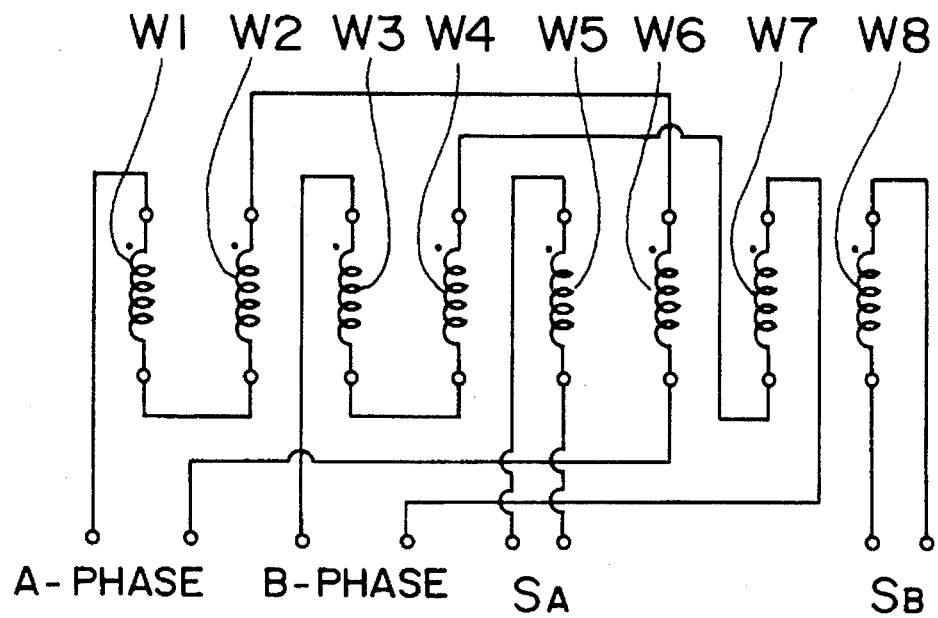
FIG. 5 is a connection diagram of stator windings.

Windings W1, W2, W6 and W3, W4, W7 wound on {(N/m)-1} or three salient poles, that is, salient poles 11, 12, 16 and 13, 14, 17 of the two sets of salient pole pairs constituting the salient pole groups are connected as shown in FIG. 5 to form A and B phases, respectively, to thereby constitute a two-phase motor.

In the windings for the A and B phases, as shown in FIG. 5, the windings W1 and W2 wound on the salient poles 11 and 12 disposed adjacent to each other to form the pair are connected to have opposite polarities to each other and the windings W1 and W6 wound on the salient poles 11 and 16 disposed to interpose the salient poles 17 and 18 of the other phase therebetween are connected to have the same polarity to form the A phase. Similarly, the windings W3 and W4 wound on the salient poles 13 and 14 disposed adjacent to each other to form the pair are connected to have opposite polarities to each other and the windings W4 and W7 wound on the salient poles 14 and 17 disposed to interpose the salient poles 15 and 16 of the other phase therebetween are connected to have the same polarity to form the B phase.

Further, the salient poles 15 and 18 which do not participate in the phase configuration of the salient pole group and the windings W5 and W8 thereof constitute sensor poles $S_A$ and $S_B$, respectively.

With the above configuration, when the salient pole pairs 11, 12; 15, 16; 13, 14; and 17, 18 of the salient pole group are excited, each pair forms a closed magnetic path and each of the closed magnetic paths is configured not to have a common magnetic path.

The sensor poles $S_A$ and $S_B$ are excited by a high-frequency oscillator not shown and can detect an inductance varied in accordance with a positional relation of the permanent magnet poles 31 of the mover 3 and the teeth 19 of the sensor poles $S_A$ and $S_B$. More particularly, when the tooth tops 19a of the sensor poles $S_A$ and $S_B$ are opposite to the permanent magnet poles 31, the inductance is at a maximum, and when the tooth bottoms 19b of the sensor poles $S_A$ and $S_B$ are opposite to the permanent magnet poles 31 with a space therebetween, the inductance is at a minimum. Further, since the teeth 19 disposed in the sensor poles $S_A$ and $S_B$ is shifted in phase in the shaft direction as described above, the sensor poles can produce mover position signals shifted in phase by 90 degrees in an electric angle.

Accordingly, with the above configuration, the two-phase permanent magnet type cylindrical linear pulse motor can be configured. In this case, the basic amount of movement for each step is a quarter of the tooth pitch of the stator teeth 19, that is, 2t (where t is a thickness of the stator core element 26). In addition, since the sensor poles $S_A$ and $S_B$ for detecting the position and the movement direction of the mover 3 are provided, the linear motor can be operated as a brushless DC servo motor.

Figure 6:
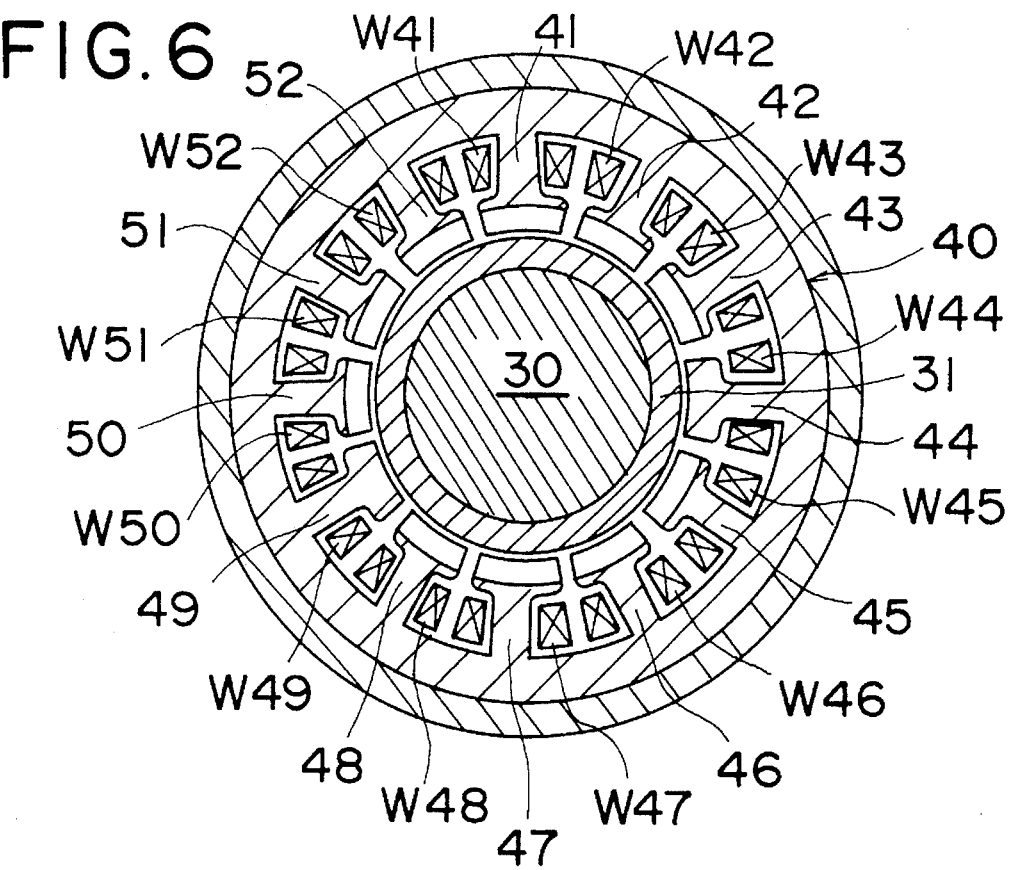
FIG. 6 is a transverse sectional view illustrating another embodiment of a linear motor (3-phase) of the present invention.

FIGS. 6 to 9 illustrate another embodiment of a linear motor of the present invention. FIG. 6 is a transverse sectional view which is similar to FIG. 2 of the embodiment of FIG. 1.

The embodiment shows the case where the phase number m and the integer k are m=3 and k=1, respectively, and accordingly the number N of the stator salient poles is N=12k=12. The embodiment of FIG. 6 is the same as the embodiment of FIG. 1 with the exception of the following description.

In FIG. 6, formed in the shaft direction in inner peripheral surfaces of 12 salient poles 41, 42, 43, . . . 52 disposed at an equal angle radially inward from a stator core 40 are a plurality of stator teeth 53 (tooth tops 53a and tooth bottoms 53b). Further, stator windings W41, W42, W43, . . . W52 are wound to the 12 salient poles 41, 42, 43, . . . 52, respectively.

Figure 7:
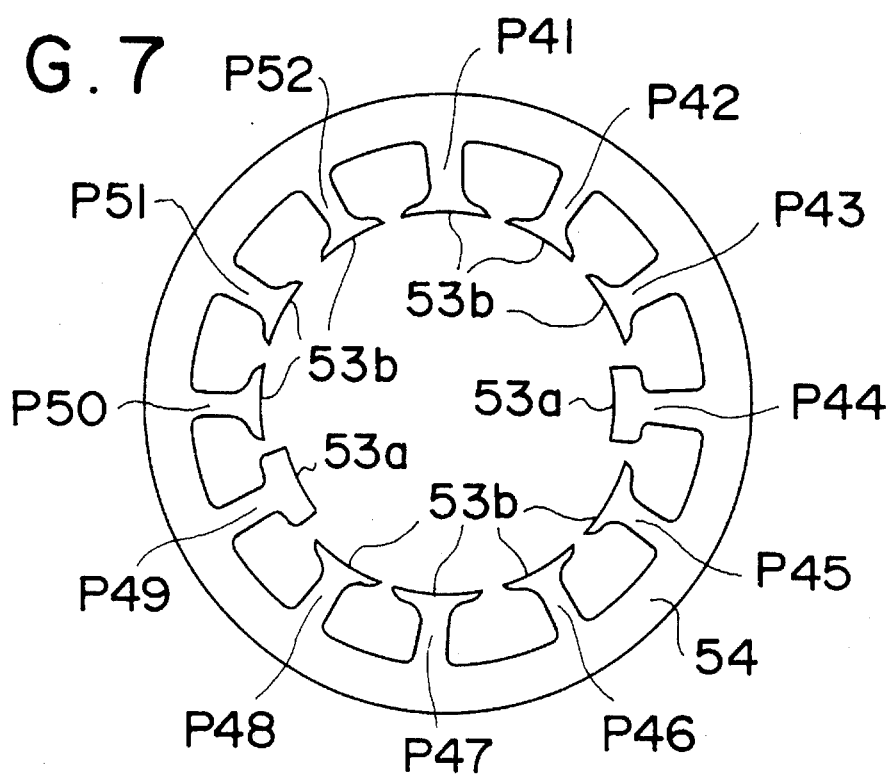
FIG. 7 is a plan view of a stator iron plate forming a stator core of FIG. 6.

FIG. 7 illustrates an example of a stator iron plate 54 forming the stator core 40. In FIG. 7, salient poles P44 and P49 of 12 salient poles P41, P42, P43, . . . P52 of the stator iron plate 54 have a small inner radius at the tip thereof and form the tooth tops 53a of the stator teeth 53. Other salient poles P41 . . . P43, P45 . . . P48, and P50 . . . P52 have a large inner radius at the tip thereof and form the tooth bottoms 53b of the stator teeth 53. The salient poles P44 and P49 having the small inner radius are disposed with an angle of 150/k= 150 degrees therebetween and the 12 salient poles are disposed in order of P41, P42, P43, . . . P52 and constitute a salient pole group.

Figure 8:
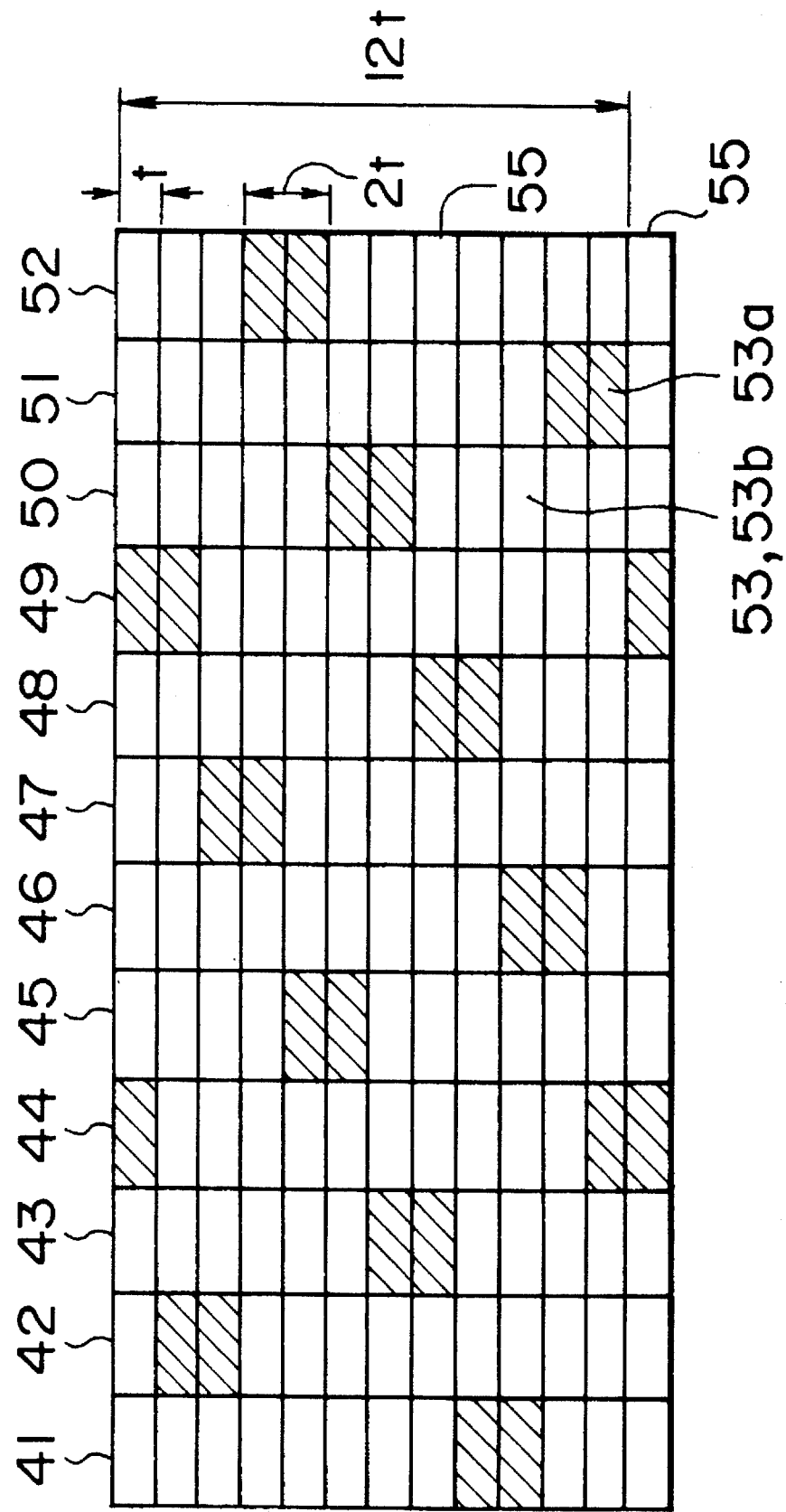
FIG. 8 is an expanded view of stator teeth formed by laminating stator iron plate with rotation by a predetermined angle as viewed from a mover.

FIG. 8 shows the stator teeth 53 including the salient poles 41, 42, 43, . . . 52 formed when stator core elements 55 formed by laminating a predetermined number of stator iron plates 54 to have a thickness of t are laminated with the elements being rotated by an angle of 150/k degrees, that is, by 150 degrees for k=1 as viewed from the mover 3. Hatched portions represent the tooth tops 53a and blank or unhatched portions represent the tooth bottoms 53b. By laminating the stator core elements 55 with sequential rotation, the stator teeth 53 having the tooth pitch of 12t (the thickness of the tooth is 2t and the thickness of the tooth bottom is 10t) are formed in the salient poles 41, 42, 43, . . . 52. Accordingly, the pitch of the permanent magnet poles 31 disposed on the mover core 30 is 6t (a half of the stator teeth pitch).

In FIG. 6, two pairs of salient poles 41, 42 and 47, 48 adjacent to each other constitute N/2m sets, that is, 2 sets for m=3 and N=12k=12 having a relation that they are disposed uniformly at an angle of 720m/N degrees, that is, 180 degrees for m=3 and N=12k=12 and the two sets constitute one set of salient pole group. The salient poles 43, 44 and 49, 50 and the salient poles 45, 46 and 51, 52 constitute other two sets having the same disposition relation and the two sets constitute one set of salient pole group, so that m=3 sets of salient pole groups are constituted in total.

Figure 9:
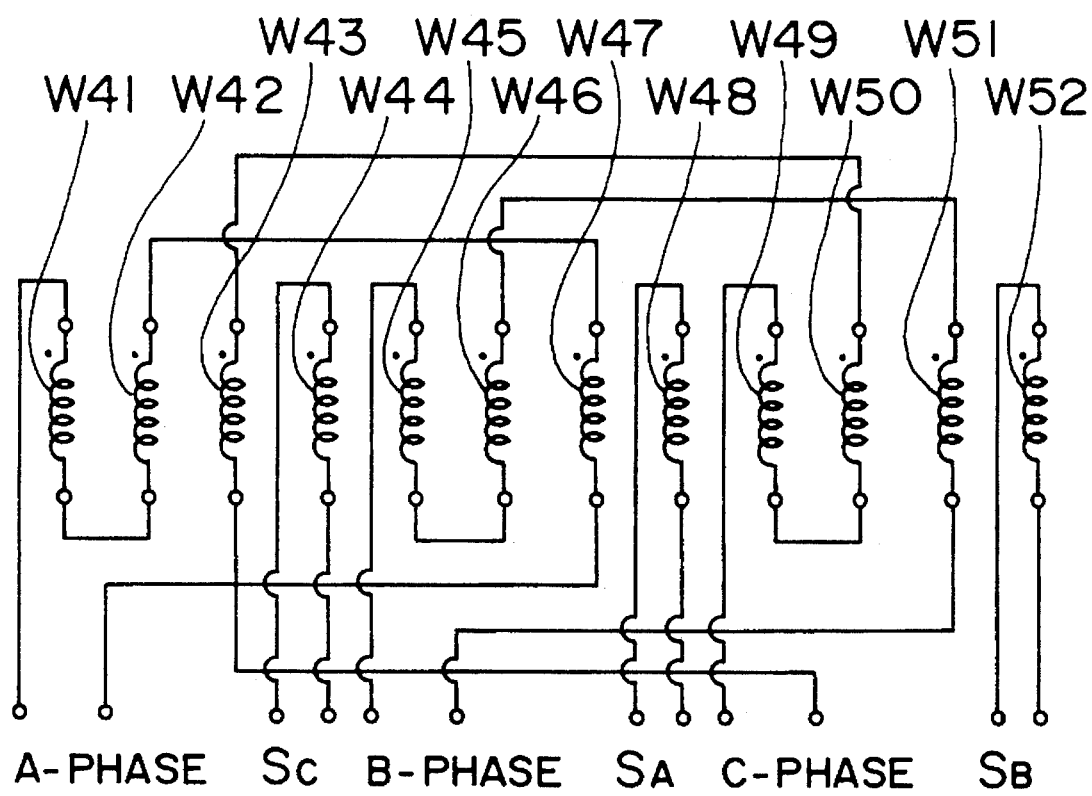
FIG. 9 is a connection diagram of stator windings of FIG. 6.
Figure 10:
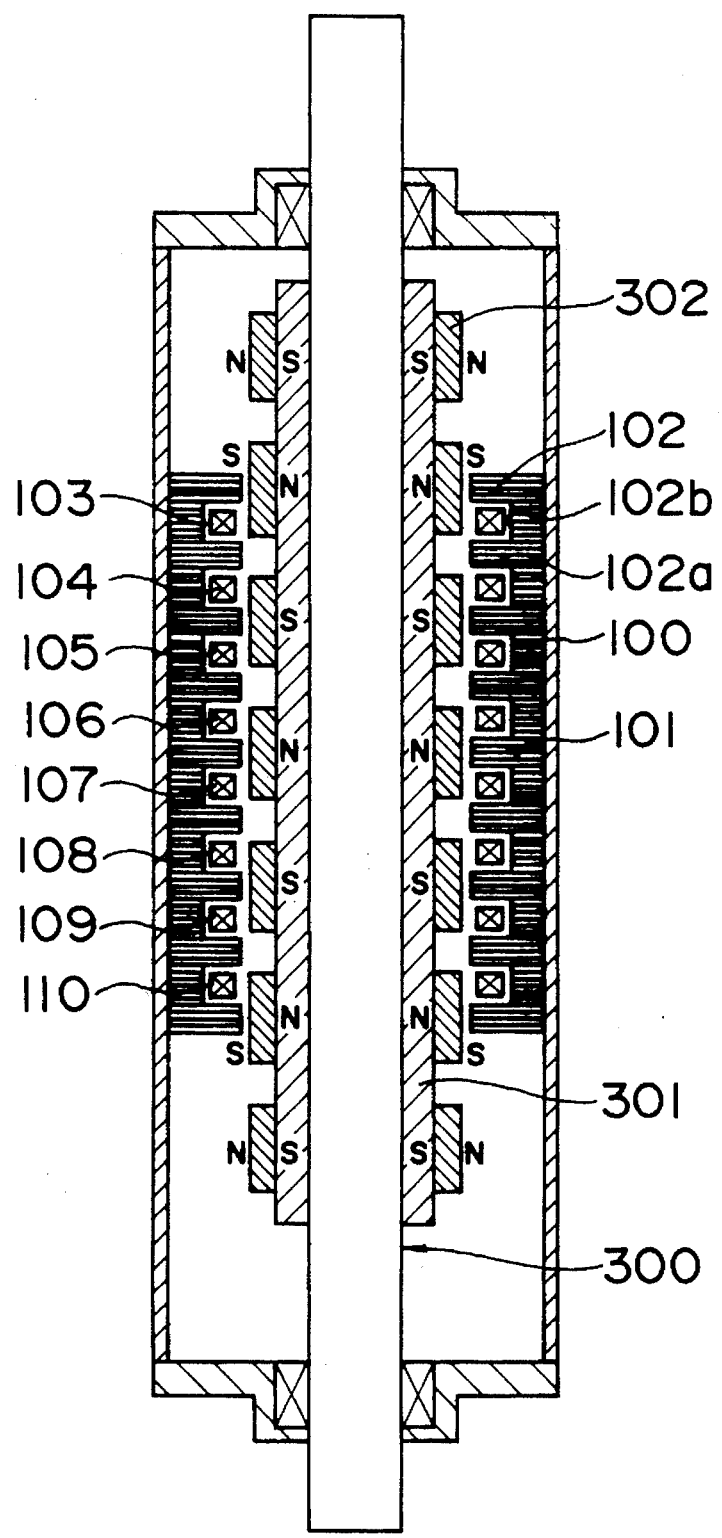
FIG. 10 is a longitudinal sectional view of a permanent magnet type cylindrical linear motor of a related art.
Figure 11:
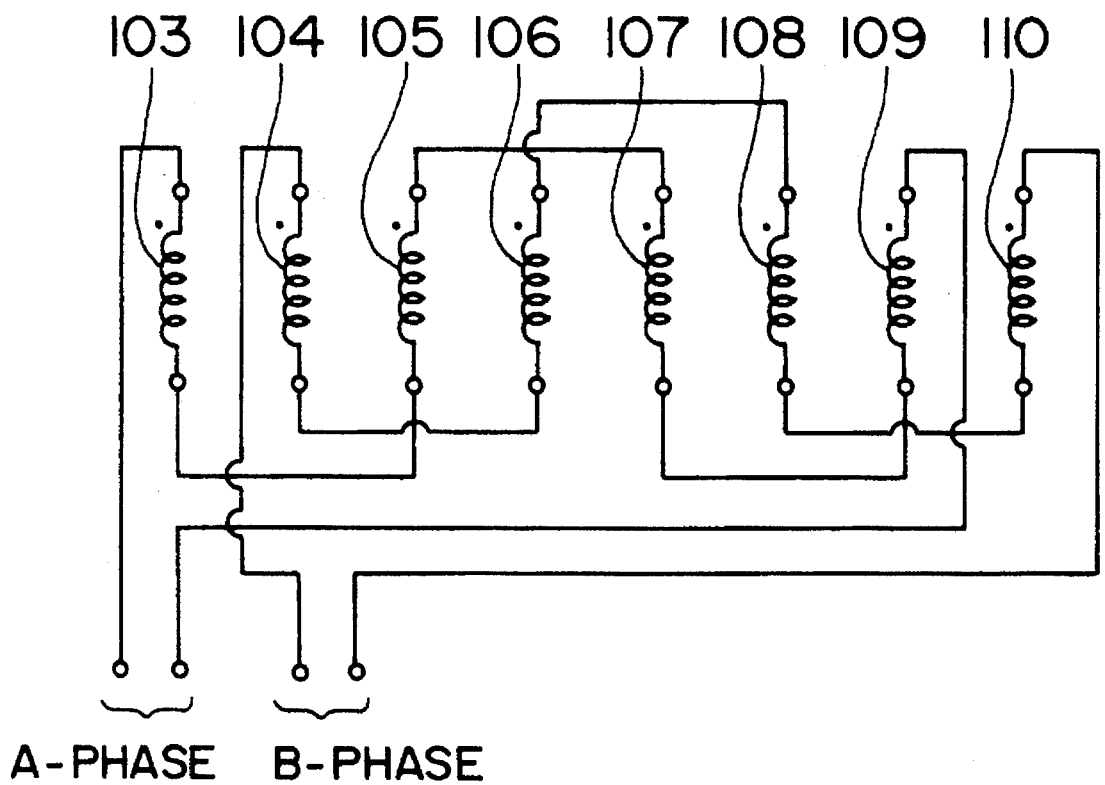
FIG. 11 is a connection diagram of stator windings of FIG. 10.

As shown in FIG. 9, the windings W41, W42, W47; W45, W46, W51; and W49, W50, W43 wound on {(N/m)-1} or three salient poles, that is, the salient poles 41, 42, 47; 45, 46, 51; and 49, 50, 43 of the two sets of salient pole pairs constituting the salient pole groups are connected as shown in FIG. 9 to form A, B and C phases, respectively, to thereby constitute a three-phase motor.

The windings for the A, B and C phases are connected as shown in FIG. 9 in the same manner as the preceding embodiment. The salient poles 44, 48 and 52 and the windings W44, W48 and W52 thereof which do not participate in the phase configuration of the salient pole group constitute the sensor poles $S_C$, $S_A$ and $S_B$, respectively.

Accordingly, with the above configuration, the three-phase permanent magnet type cylindrical linear pulse motor can be configured. In this case, the basic amount of movement for each step is a quarter of the tooth pitch of the stator teeth 53, that is, 3t (where t is a thickness of the stator core element 55). Further, since the sensor poles $S_A$, $S_B$ and $S_C$ for detecting the position and the movement direction of the mover 3 are provided, the motor can be operated as a brushless DC servo motor.

The technique of the present invention is not limited to the technique of the embodiments and may be another means for attaining the similar function. Further, the technique of the present invention can be modified and added variously within the scope of the above configuration.

As apparent from the above description, according to the present invention, the two- or three-phase permanent magnet type linear pulse motor or brushless DC permanent magnet type linear motor can be configured, and the windings wound on the salient poles are disposed in the stator core in the circumferential direction. Accordingly, the winding accommodation portion can be enlarged to increase the ampere-conductors without dependency on the tooth pitch, so that a small linear motor capable of producing a large driving force can be configured.

Furthermore, since a predetermined number of stator iron plates can be laminated to form the stator core elements and the stator core elements can be laminated with sequential rotation by a predetermined angle to form the stator core, the productivity thereof is excellent.

In addition, since the sensor poles for detecting the position and the movement direction of the mover is included, the linear servo system can be formed inexpensively as the brushless DC linear motor without the need of providing detection means such as an encoder and a resolver separately.

We claim:

1. A linear motor including a stator provided with a stator core having an even number of salient poles disposed at equal angle radially inward and a plurality of stator teeth formed on inner peripheral surfaces of said salient poles in a shaft direction and windings wound on said salient poles individually and a mover provided with a mover core disposed within said stator and supported movably in the shaft direction and having a plurality of permanent magnet poles disposed on an outer periphery thereof in the shaft direction at equal pitch equal to a half of a pitch of said stator teeth and magnetized in the radial direction to have different polarities alternately in the shaft direction, characterized in that said stator core includes stator core elements formed by laminating a predetermined number of stator iron plates of said stator core and said stator core elements are laminated with said elements being rotated sequentially by the equal angle determined by an arrangement of said salient poles of said stator iron plates to form said stator core, said stator salient poles being constituted by pairs of salient poles and including m sets of salient pole groups composed of (N/2m) sets of salient pole pairs disposed uniformly at an angle of (720m/N) degrees where N is the number of said stator salient poles and m is the number of phases of said motor, each of said pairs of salient poles being defined by two salient poles that are next to one another, windings wound on (N/m)-1 or (N/m)-2 salient poles belonging to said salient pole groups being connected to have opposite polarities to each other between said pair of salient poles and being connected to have the same polarity to each other between said salient poles which do not constitute said pair of salient poles and are disposed to interpose said salient pole of the other phase therebetween to constitute phase windings for m phases, remaining salient poles, which do not participate in phase configuration, of said salient pole group for the phases, being arranged to detect a position in the shaft direction and a movement direction of said mover as sensor poles, whereby said linear motor can be operated as an m-phase linear pulse motor or a brushless DC linear motor.

2. A linear motor according to claim 1, wherein said stator iron plates of said stator core include 8k salient poles when the number of phases m is 2 and k is an integer equal to or larger than 1, and k sets of salient pole groups formed by two salient poles having a small inner radius and six salient poles having a large inner radius at the tip of said salient poles opposite to said mover as viewed from said mover are disposed in the circumferential direction, said two salient poles having the small inner radius being disposed with an angle of (135/k) degrees to each other, said stator core being formed by said stator core elements laminated with sequential rotation by (135/k) degrees, a disposition pitch of said permanent magnet poles disposed on said mover core being 4t when a thickness of said stator core element in the shaft direction is t.

3. A linear motor according to claim 1, wherein said stator iron plates of said stator core include 12k salient poles when the number of phases m is 3 and k is an integer equal to or larger than 1, and k sets of salient pole groups formed by two salient poles having a small inner radius and ten salient poles having a large inner radius at the tip of said salient poles opposite to said mover as viewed from said mover are disposed in the circumferential direction, said two salient poles having the small inner radius being disposed with an angle of (150/k) degrees to each other, said stator core being formed by said stator core elements laminated with sequential rotation by (150/k) degrees, a disposition pitch of said permanent magnet poles disposed on said mover core being 6t when a thickness of said stator core element in the shaft direction is t.

\* \* \* \* \*